S. D. IRWIN.
BATTERY MUD EXTRACTING DEVICE.
APPLICATION FILED JULY 1, 1918.

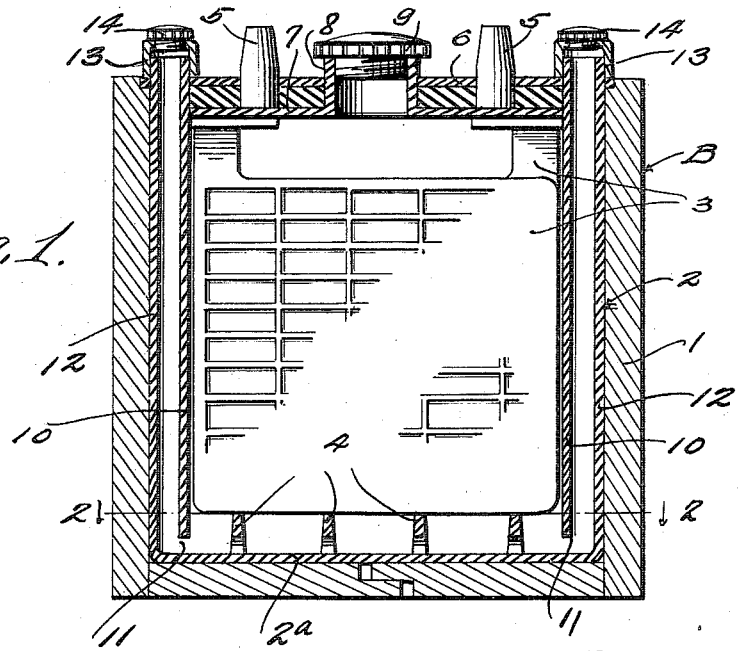
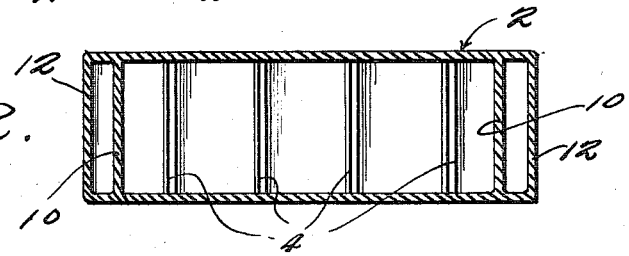
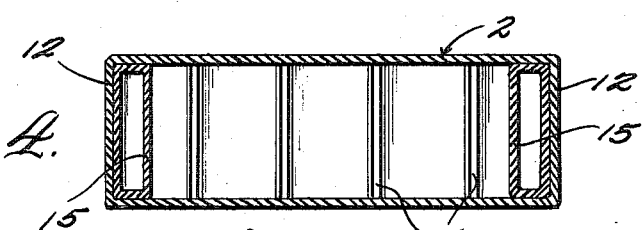
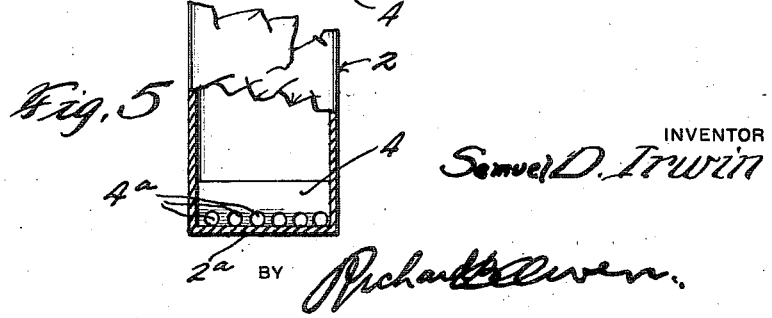

1,296,961.

Patented Mar. 11, 1919.
2 SHEETS—SHEET 2.

INVENTOR
Samuel D. Irwin

WITNESSES
G. C. Walling
H. H. Babcock

BY
Richard B. Owen
ATTORNEY

UNITED STATES PATENT OFFICE.

SAMUEL D. IRWIN, OF FLOYDADA, TEXAS.

BATTERY-MUD-EXTRACTING DEVICE.

1,296,961.  Specification of Letters Patent.  Patented Mar. 11, 1919.

Application filed July 1, 1918.  Serial No. 242,798.

*To all whom it may concern:*

Be it known that I, SAMUEL D. IRWIN, a citizen of the United States, residing at Floydada, in the county of Floyd and State of Texas, have invented certain new and useful Improvements in Battery-Mud-Extracting Devices, of which the following is a specification.

This invention relates to electric batteries, and more particularly to a secondary or storage battery.

One of the main objects of the invention is to provide a storage battery of simple construction and operation in which the sediment or mud formed by "sloughing off" of the active material of the electrode plates may be readily removed. A further object is to provide a battery in which the mud may be removed without necessitating disassembling of the battery or displacing of the electrode plates thereof. Another object is to provide a battery in which the jar or container is provided adjacent each end, with an opening extending from the top to within a short distance of the bottom of the jar so as to permit a liquid to be passed through the battery in either direction, for the purpose of washing the same out and removing the mud therefrom. Further objects will appear from the detailed description.

In the drawings:—

Figure 1 is a vertical sectional view taken through a battery constructed in accordance with my invention.

Fig. 2 is a section taken substantially on line 2—2 of Fig. 1.

Fig. 4 is a section taken substantially on line 4—4 of Fig. 3.

Fig. 5 is a fragmentary end view of the jar partly broken away to show the construction of the bridge member for supporting the electrode plate.

Figure 6:
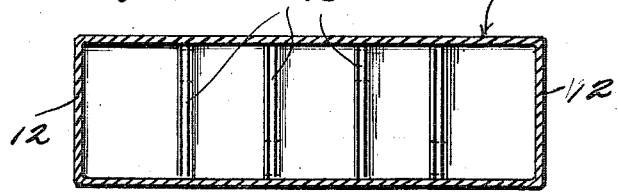

Fig. 6 is a horizontal sectional view taken through the container showing another form of bridge member.

Figure 7:
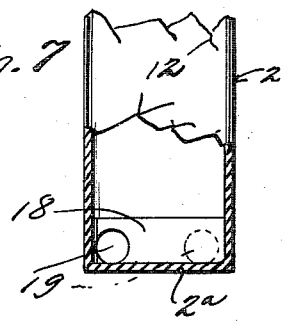

Fig. 7 is a fragmentary end view of the jar broken away to show in side elevation the form of bridge member illustrated in Fig. 6.

Figure 8:
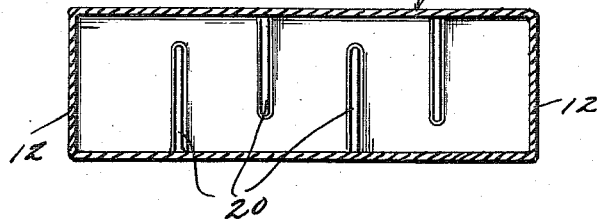

Fig. 8 is a figure similar to Fig. 6 of a modified form of bridge member.

Figure 3:
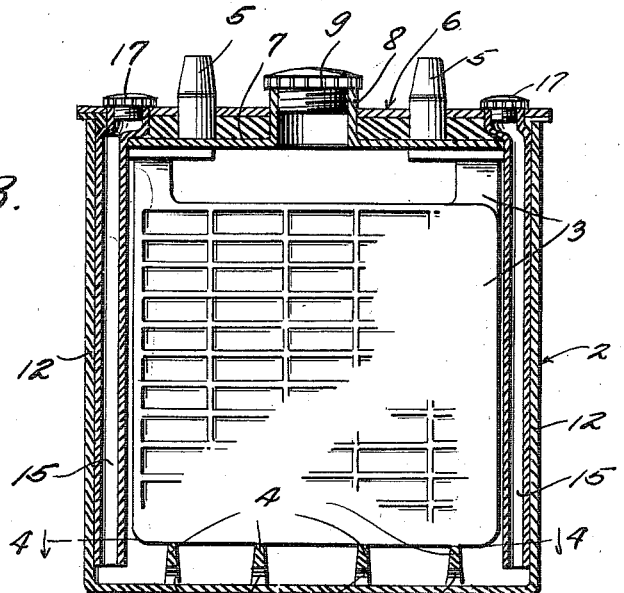
Fig. 3 is a view similar to Fig. 1 of a modified form of my battery.
Figure 10:
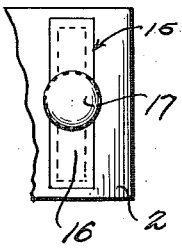
Figure 9:
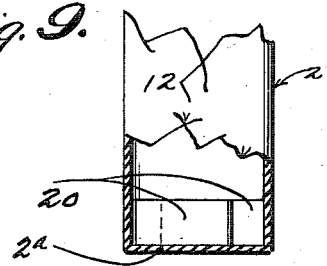

Fig. 9 is a view similar to Fig. 7 showing the form of bridge member illustrated in Fig. 8, and Fig. 10 is a fragmentary top plan view of the form of battery illustrated in Fig. 3.

The battery designated generally by B may be of any suitable or standard construction, and is provided with the outer casing 1 in which is mounted the jar or container 2. A plurality of electrode plates 3 are mounted within the jar and are supported a suitable distance above the bottom of the jar by the ribs or bridge members 4, which are formed integral with jar 2. The electrode plates are provided with terminal members 5 which project through the cover 6 of the battery and are adapted to receive terminal connectors of suitable construction. The jar 2 is further provided with a top plate or closure member 7 at the center of which is formed an upwardly projecting neck 8 of tubular construction into which is threaded a closure plug 9. This neck serves to permit the usual acid solution to be placed within jar 1, when required. The battery so far described is of standard construction and forms no part of my invention except in so far as it coöperates with the means to be hereinafter described for bringing about the desired results.

Jar 2 is provided adjacent each end, with a baffle wall 10 which extends the full width of the jar and to within a short distance of the bottom thereof, so as to leave a transverse slot or opening 11 between the bottom of the jar and the wall 10. This baffle wall 10 coöperates with the adjacent end wall 12 of the jar to provide a tubular member extending the full width of the jar and communicating therewith at its lower end. As will be noted, wall 10 and end wall 12 of the jar both project a short distance above the top plate 6, the upper end of each of these tubes formed by these walls being closed by a closure cap 13 secured thereon. This cap is provided with an opening through its top and is threaded to receive a closure plug 14 which is screwed therein. As will be noted more clearly from Figs. 1 and 5 of the drawings, each of the bridge members 4 is provided with a plurality of spaced openings $4^a$. These openings are positioned closely adjacent the bottom $2^a$ of jar 2.

Normally the openings in the cap 13 of the tubular member at the ends of jar 1 will be closed by the plug 14, as illustrated. During the operation of the battery a certain amount of the active material of the electrode plates 3 will disintegrate or "slough-off", this material accumulating in the lower portion of the jar between the bridge members 4. By removing the plug 14 and inserting the tube of a suction pump into one of the tubular members at the end of the jar 2, the electrolyte may be removed from the battery, a portion of the sediment or mud being also removed. After the electrolyte has been removed, a hose which is connected to a suitable source of supply of water may be inserted into the tube at the other end of the battery, the water flowing into the battery at one end and being removed therefrom at the other end by the suction pump. This water flowing through the battery will act to wash the sediment or mud to the outlet end thereof through the openings 4ᵃ of the members 4, this mud being removed by the action of the suction pump and, if desired, collected by means of a suitable trap to which the suction pump may be connected. Also, this water in flowing through the battery will serve to thoroughly wash out and clean the interior thereof and the electrode plate. After the battery has been thus washed and the the mud removed therefrom, a new supply of electrolyte may be poured into the jar 2 through neck 8 in the ordinary manner. By this means, the battery may be quickly and easily washed out and cleaned at stated periods without necessitating disassembling thereof or in any way disturbing any of the elements of the battery. The provision of the tubular members at the ends of the battery and communicating with the jar 2 adjacent the lower end thereof thus permits removal of the mud or sediment from the battery when desired or necessary thus eliminating the danger of short circuiting due to the accumulation of sediment in the lower portion of container 2 to such an extent as to contact with the lower edges of the electrode plates, such as frequently occurs in storage batteries of common construction.

In the modified form illustrated in Figs. 3 and 4, instead of providing a baffle wall 10 adjacent each end wall 12 of the jar 2, I provide a tube 15 which fits snugly within the jar and extends to within a short distance of the bottom end thereof. This tube is provided, at its upper end, with a top or closure wall 16 having an opening into which is threaded a closure plug 17. The operation of this form of battery is the same as that of the form illustrated in Figs. 1 and 2.

If desired, the type of bridge members employed for supporting the electrode plates may be made varied. In Fig. 6 the bridge members 18, instead of being provided with a plurality of relatively small openings, are each provided with a relatively large opening 19 adjacent one end thereof, these openings being alternately arranged so as to cause the water flowing through the lower portion of the jar to assume a substantially zigzag or tortuous course, thus producing whirls or eddy currents which serve to more readily remove the sediment or mud and to wash it from the inlet end to the discharge end of the container. In the form of bridge members illustrated in Figs. 8 and 9 these members 20 are disposed in staggered relation extending alternately from the opposite side walls of the container or jar to within a short distance of the other walls of the jar, thus causing the water to assume a zigzag or tortuous course during its flow from one end to the other end of the jar so as to facilitate removal of the mud therefrom.

The foregoing description and the drawings have reference to what may be considered the preferred or approved form of invention. It is to be understood however, that I may make such changes in construction and arrangement and combination of parts, materials dimensions, etc., as may prove expedient and fall within the scope of the appended claim.

Having thus described my invention what I claim as new and desire to secure by Letters Patent is:—

In a battery, a container, upright tubes secured in the ends of the container, said tubes being closed at their upper ends and provided with removable closure members and communicating at their lower ends with the interior of the container a short distance from the bottom thereof, and bridge members extending transversely of the bottom of the container, and provided with spaced openings, and a plurality of electrode plates mounted within the container and supported by said bridge members.

In testimony whereof I affix my signature in presence of two witnesses.

SAMUEL D. IRWIN.

Witnesses:
J. B. BANTLEY,
W. B. CLARK.